United States Patent
Bauchspies

(10) Patent No.: US 10,331,936 B2
(45) Date of Patent: Jun. 25, 2019

(54) DUPLICATE PATTERN RECONSTRUCTIONS

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 82 days.

(21) Appl. No.: 15/205,318

(22) Filed: Jul. 8, 2016

(65) Prior Publication Data

US 2017/0017829 A1    Jan. 19, 2017

Related U.S. Application Data

(60) Provisional application No. 62/192,525, filed on Jul. 14, 2015.

(51) Int. Cl.
*G06K 9/00* (2006.01)

(52) U.S. Cl.
CPC ..... *G06K 9/00067* (2013.01); *G06K 9/00026* (2013.01); *G06K 9/00087* (2013.01); *G06K 9/00926* (2013.01)

(58) Field of Classification Search
CPC .................................. G06K 9/00006–9/0012
See application file for complete search history.

(56) References Cited

U.S. PATENT DOCUMENTS

| | | | | |
|---|---|---|---|---|
| 6,546,122 B1 * | 4/2003 | Russo | ................ | G06K 9/00026 382/125 |
| 7,203,347 B2 * | 4/2007 | Hamid | ................ | G06K 9/0002 340/5.53 |
| 7,236,617 B1 * | 6/2007 | Yau | ................... | G06K 9/00026 382/125 |
| 2003/0123714 A1 * | 7/2003 | O'Gorman | ......... | G06K 9/00026 382/124 |
| 2003/0126448 A1 * | 7/2003 | Russo | ............... | G06K 9/00026 713/186 |
| 2015/0071506 A1 | 3/2015 | Boshra et al. | | |
| 2015/0131876 A1 | 5/2015 | Chang | | |
| 2016/0132711 A1 * | 5/2016 | Setterberg | ......... | G06K 9/00926 382/124 |
| 2016/0253547 A1 | 9/2016 | Bauchspies | | |
| 2017/0004350 A1 | 1/2017 | Clausen | | |
| 2017/0004642 A1 | 1/2017 | Bauchspies | | |

(Continued)

FOREIGN PATENT DOCUMENTS

| | | | | |
|---|---|---|---|---|
| EP | 1671260 B1 * | 6/2014 | ......... | G06K 9/00026 |
| EP | 3118773 A1 | 1/2017 | | |

(Continued)

OTHER PUBLICATIONS

Extended European Search report for Application No. 16179572.9-1901 dated Nov. 28, 2016.

(Continued)

*Primary Examiner* — Aaron W Carter
(74) *Attorney, Agent, or Firm* — Kilpatrick Townsend & Stockton LLP

(57) ABSTRACT

A system, method, and computer program product for multiplicating pattern images used as a trusted resource while reducing user participation, such as, for example, a producing N number (N>1) of reconstructed pattern images using shared images common to at least two constructed pattern images.

12 Claims, 6 Drawing Sheets

(56) References Cited

U.S. PATENT DOCUMENTS

| | | |
|---|---|---|
| 2017/0011540 A1 | 1/2017 | Bauchspies et al. |
| 2017/0017829 A1* | 1/2017 | Bauchspies |
| 2018/0046847 A1* | 2/2018 | Bauchspies ........ G06K 9/00013 |
| 2018/0075310 A1* | 3/2018 | Bauchspies ........ G06K 9/00087 |
| 2018/0165508 A1* | 6/2018 | Othman ............. G06K 9/00093 |

FOREIGN PATENT DOCUMENTS

| | | |
|---|---|---|
| WO | 03007127 A2 | 1/2003 |
| WO | 2005034021 A1 | 4/2005 |

OTHER PUBLICATIONS

Nalini K. Ratha et al.: "Image Mosiacing for Rolled Fingerprint Construction", Jan. 1, 1998 (Jan. 1, 1998), XP055319693, Retrieved from the Internet on Nov. 15, 2016: URL:https://pdfs.semanticscholar.org/d1 c6/ea313b5c05c6b891e298edea606e229ec2d5.pdf.

Davide Maltoni et al: "Chapter 1: Introduction" In: "Handbook of Fingerprint Recognition", 2009, Springer, London, GB, XP055320451, ISBN: 978-1-84882-253-5, pp. 1-56.

Davide Maltoni et al: "Chapter 2: Fingerprint Sensing" In: "Handbook of Fingerprint Recognition", 2009, Springer, London, GB, XP055320391, ISBN: 978-1-84882-253-5, pp. 57-95.

Davide Maltoni et al: "Excerpt from Chapter 7: Biometric Fusion" In: "Handbook of Fingerprint Recognition", 2009, Springer, London, GB, XP055320662, ISBN: 978-1-84882-253-5, pp. 316-317.

\* cited by examiner

DUPLICATE PATTERN RECONSTRUCTIONS

CROSS REFERENCE TO RELATED APPLICATIONS

This application claims benefit of U.S. Patent Application No. 62/192,525, the contents of which are hereby expressly incorporated by reference thereto in its entirety for all purposes.

FIELD OF THE INVENTION

The present invention relates generally to automated machine-implemented pattern testing, and more specifically, but not exclusively, to systems, methods, and computer program products for multiplicating pattern reconstructions using a common set of images of that pattern, such as, for example, an pattern reconstruction used in pattern verification systems, methods, and computer program products, including fingerprint verification systems.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Pattern verification, such as in a context of registration of a trusted fingerprint into a trusted memory of a fingerprint verification system, requires a sufficiently accurate and precise image of the trusted fingerprint. This image may be obtained directly from an imaging sensor. This may be suitable for large area imaging sensors. However, for many applications, the trusted image is reconstituted from images of the trusted fingerprint taken from a sensor having a sensing area smaller than the final image. For many mobile applications and electronic platforms, such as smartphones and the like, the use of the small area sensor provides a smaller form factor having a lower cost of goods which is important to implementation and adoption. However use of the smaller area sensor impacts registration and user experiences during verification.

Any mobile electronic platform having a fingerprint verification system typically includes a registration system that establishes and writes one or more trusted images into a trusted database/memory. Test fingerprints are compared against the trusted image(s) using a matching engine that matches features of interest from the test fingerprint against features of interest from the trusted image(s). A quality of the test image and of the trusted images impact the user experience.

Whatever the size of the imaging sensor, the trusted image may be derived from a single impression from a single finger, or derived from a composition of multiple impressions. Each solution offers different challenges.

It is technically possible to rely on a single impression of a single finger using a small area sensor for registration. However, during use, the user must not only recall which portion of which finger was registered, but each verification attempt relies on the user reimaging this same portion of the same finger sufficiently close that it may be matched. As the imaging sensor area becomes smaller, reliance on a single impression can become very frustrating for the user.

Many systems using a small area sensor therefore register a single finger using multiple impressions. An initial impression of an image always provides completely unique information of the larger image to be reconstituted. However, subsequent impressions have varying usefulness depending upon whether the user provides an impression that partially overlaps and partially presents new image data. The user has difficulties in placing a finger for multiple impressions to ensure only unique partial overlapping data is presented with each impression, particularly over a breadth of an entire fingerprint pattern. It is too easy for a user to provide subsequent images with too much overlap or with too little or no overlap. A user does not know when or if they have provided enough sufficiently overlapping image impressions that map enough of the total fingerprint to provide an end product that provides the user with an easy-to-use verification system.

Systems for processing images of a pattern may sometimes be desirably implemented using limited computing and memory resources. As an active area of a sensor decreases, a greater number of images are needed to cover any particular area of the pattern. Managing and processing multiple images can sometimes negatively impact performance.

Collection of a set of images of portions of a pattern for reconstruction of the pattern introduces a number of noise sources including the sensor, variations in the pattern itself, and an interaction of the sensor and the pattern. This source of noise, in turn, affects a quality of the reconstructed pattern. The reconstructed pattern may be used in a number of ways and the accuracy of those uses are often influenced by the quality of the reconstructed pattern.

A user attempting to register a specific finger (the registration relying on a reconstruction of an image of a fingerprint from the specific finger) multiple times would be extremely unlikely to reproduce 100% exact reconstructions each time. While each reconstruction has a chance, based upon a number of factors, of matching another reconstruction, a source of error in falsely rejecting a user because of a failed match increases due to the inherent variations in registering a reconstructed image and then testing the specific finger against the trusted registration image.

One way to decrease a chance of a false rejection is to register multiple reconstructed images of the same specific finger. These multiple reconstructed images of the same pattern will be different from each other and thus more likely that one will match to a user's verification attempt.

While the number of images in the set of images used to reconstruct an image varies, for a particular sensor area, resolution, pattern size, user overlap placement, and desired pattern coverage area, a finite number of images, say N number, are sampled. Conventionally, to form M number of reconstructions, M×N number of images must be collected, on average. Collecting this number of images would be considered too time consuming and unwieldly in most cases. While the conventional solution of collecting the M×N number of images likely improves performance, the solution is unlikely to be adopted as the number of impressions to be collected from the user increases.

What is needed is a system, method, and computer program product for multiplicating pattern images used as a trusted resource while reducing user participation.

BRIEF SUMMARY OF THE INVENTION

Disclosed is a system, method, and computer program product for multiplicating pattern images used as a trusted resource while reducing user participation, such as, for example, a producing N number (N>1) of reconstructed pattern images using shared images common to at least two constructed pattern images.

The following summary of the invention is provided to facilitate an understanding of some of the technical features related to multiplicating pattern reconstructions and is not intended to be a full description of the present invention. A full appreciation of the various aspects of the invention can be gained by taking the entire specification, claims, drawings, and abstract as a whole. The present invention is applicable to other pattern reconstructions in addition to fingerprint reconstructions, and to other uses in addition to reconstructed pattern registration.

In an embodiment of the present invention, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure with impressioner, sensor, imager or other impression producing structure sometimes referred to herein as a pattern collector), the system may produce an impression (e.g., an image) of a portion of the pattern (fingerprint) of the pattern source (finger) of the user. Impressions (images) may be collected and evaluated, in bulk or in realtime or in near realtime depending upon a particular implementation. Reconstruction of the pattern or of the pattern map may happen in a reconstruction space of the system (e.g., a portion of memory) or may happen in some other manner, where an initial impression (a foundation image) is selected and placed in an otherwise null reconstruction space. The system may qualify each impression (image) and may divide the impressions into a reconstruction set and a reserve set based upon matching or correlating to the reconstruction. As the qualification proceeds (matching and correlating to the reconstruction) a qualified set of impressions (images) are identified (the reconstruction set) and are added into the reconstruction space as they are matched/correlated or into the reserve space (e.g., a different portion of the memory as not matched/not correlated). A reconstruction (e.g., a reconstruction image or other representation of the pattern or pattern map) is produced from the impressions (images) from the reconstruction set and reconstructed in the reconstruction space. The reconstruction may occur as each impression is added into the reconstruction space or the reconstruction may occur after identification of multiple elements of the reconstruction set. Additional reconstructions (i.e., multiplicated reconstructions) may be produced from a different arrangement of the impressions in the reconstruction set. In some instances it may be sufficient to select a new combination order of the impressions. In other instances, there may be a selection of impressions based upon how much contribution has been made to any particular impression. In other instances, it may be the case that a new reconstruction includes a limited number of new impressions from the pattern source with other impressions from the reconstruction set being used to complete any particular multiplicated reconstruction. In this way, a limited set of impressions in a reconstruction set may be used to create an entire set of multiplicated reconstruction images which collectively represent the same pattern source in slightly different ways. Using this set of multiplicated reconstructions may improve robustness of a system trying to match to the pattern source without the inefficiencies and possible user aggravation in providing unique impressions for each reconstruction.

An embodiment of the present invention may use a set of images of a pattern for producing a plurality of related, but different, reconstructions of that pattern. When reconstructing the pattern from a set of images of that pattern, each image contributing to the reconstructed pattern has contributed some new information while also including some duplicated information to allow the image to be appropriately placed. Desirably each image includes just enough duplicated information to allow it to be placed (within the desired level of confidence) within the pattern while maximizing an amount of unique information to be added into the reconstruction image. As explained further below, an order of processing of the images affects which part(s) of which images are duplicated and which parts provide unique information. By intentionally reordering the processing of the image reconstructions, different but related pattern reconstructions may be obtained. These different reconstructions may all be registered into a trusted registration system for example and multiplicate the pattern reconstructions without any additional user involvement.

An embodiment may include a machine-implemented method for multiplicating a reconstruction of a portion of a representation of a pattern from a set of impressions, each impression including a portion of the pattern, the method including a) identifying a reconstruction set of impressions from the set of impressions that all match or correlate to at least one other impression in the reconstruction set, the reconstruction set of impressions excluding impressions that are do not match or do not correlate to at least one other impression in the reconstruction set; b) producing an initial reconstruction from an initial reconstruction subset of the reconstruction set from a first combination of the impressions of the initial reconstruction subset; and c) producing at least one multiplicated reconstruction from the initial reconstruction subset from an additional combination of the impressions of initial reconstruction subset, each the additional combination different from all other the combinations.

An embodiment may include an apparatus for multiplicating a reconstruction of a portion of a representation of a pattern from a set of impressions, each impression including a portion of the pattern, including a pattern collector producing one or more of the impressions; and a processing system, coupled to the pattern collector, including a processor and a memory coupled to the processor, the memory storing a plurality of computer executable instructions wherein the processor executes the plurality of computer executable instructions to perform a method, including a) identifying a reconstruction set of impressions from the set of impressions that all match or correlate to at least one other impression in the reconstruction set, the reconstruction set of impressions excluding impressions that are do not match or do not correlate to at least one other impression in the reconstruction set; b) producing an initial reconstruction from an initial reconstruction subset of the reconstruction set from a first combination of the impressions of the initial reconstruction subset; and c) producing at least one multiplicated reconstruction from the initial reconstruction subset from an additional combination of the impressions of initial reconstruction subset, each the additional combination different from all other the combinations.

An embodiment may include a non-transitory computer readable medium with computer executable instructions stored thereon executed by a processor to perform the method of multiplicating a reconstruction of a portion of a representation of a pattern from a set of impressions, each impression including a portion of the pattern, the method including a) identifying a reconstruction set of impressions from the set of impressions that all match or correlate to at least one other impression in the reconstruction set, the reconstruction set of impressions excluding impressions that are do not match or do not correlate to at least one other impression in the reconstruction set; b) producing an initial reconstruction from an initial reconstruction subset of the reconstruction set from a first combination of the impressions of the initial reconstruction subset; and c) producing at least one multiplicated reconstruction from the initial reconstruction subset from an additional combination of the impressions of initial reconstruction subset, each the additional combination different from all other the combinations.

An embodiment may include a method for registering a set of representations of a pattern (for example, 2 or more representations), including a) reconstructing a first representation of the pattern using a set of impressions associated with each other in a first manner; b) multiplicating the first representation to reconstruct a second representation of the pattern using the set of impressions associated with each other in a second manner different from the first manner; and c) registering the first representation and the second representation into a trusted memory with both the representations accepted as trusted representations of the pattern. In the method, the pattern may include a fingerprint, wherein the first representation includes a first reconstruction image of the fingerprint, wherein the set of impressions include a set of bitmap images, each of the bitmap images including a portion of the fingerprint, wherein the association between the bitmap images of the set of bitmap image includes a matching or a correlating relationship, wherein the first manner includes a first order of matching or correlating the bitmap images of the set of bitmap images, wherein the second representation includes a second reconstruction image of the fingerprint, and wherein the second manner includes a second order of matching or correlating the bitmap images of the set of bitmap images.

An embodiment may include an apparatus for registering a set of representations of a pattern (for example two or more representations), including a pattern collector producing one or more of impressions of the pattern; and a processing system, coupled to the pattern collector, including a processor and a memory coupled to the processor, the memory storing a plurality of computer executable instructions wherein the processor executes the plurality of computer executable instructions to perform a method, including a) reconstructing a first representation of the pattern using a set of impressions associated with each other in a first manner; b) multiplicating the first representation to reconstruct a second representation of the pattern using the set of impressions associated with each other in a second manner different from the first manner; and c) registering the first representation and the second representation into a trusted memory with both the representations accepted as trusted representations of the pattern.

An embodiment may include a non-transitory computer readable medium with computer executable instructions stored thereon executed by a processor to perform the method of registering a set of representations of a pattern (for example, two or more), the method including a) reconstructing a first representation of the pattern using a set of impressions associated with each other in a first manner; b) multiplicating the first representation to reconstruct a second representation of the pattern using the set of impressions associated with each other in a second manner different from the first manner; and c) registering the first representation and the second representation into a trusted memory with both the representations accepted as trusted representations of the pattern.

Other embodiments of the present invention may collect a limited number of new images from additional impressions, the limited number of new images may be used in conjunction with previously stored images to produce hybrid pattern reconstruction images. These pattern reconstruction images are hybrid in the sense that they include some new image data from a few new images (few being significantly less than needed to reconstruct the pattern) combined with images used in previous pattern reconstructions of the same pattern. In these hybrid reconstructions, a priority may be given for use of unique information from the previously used images.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
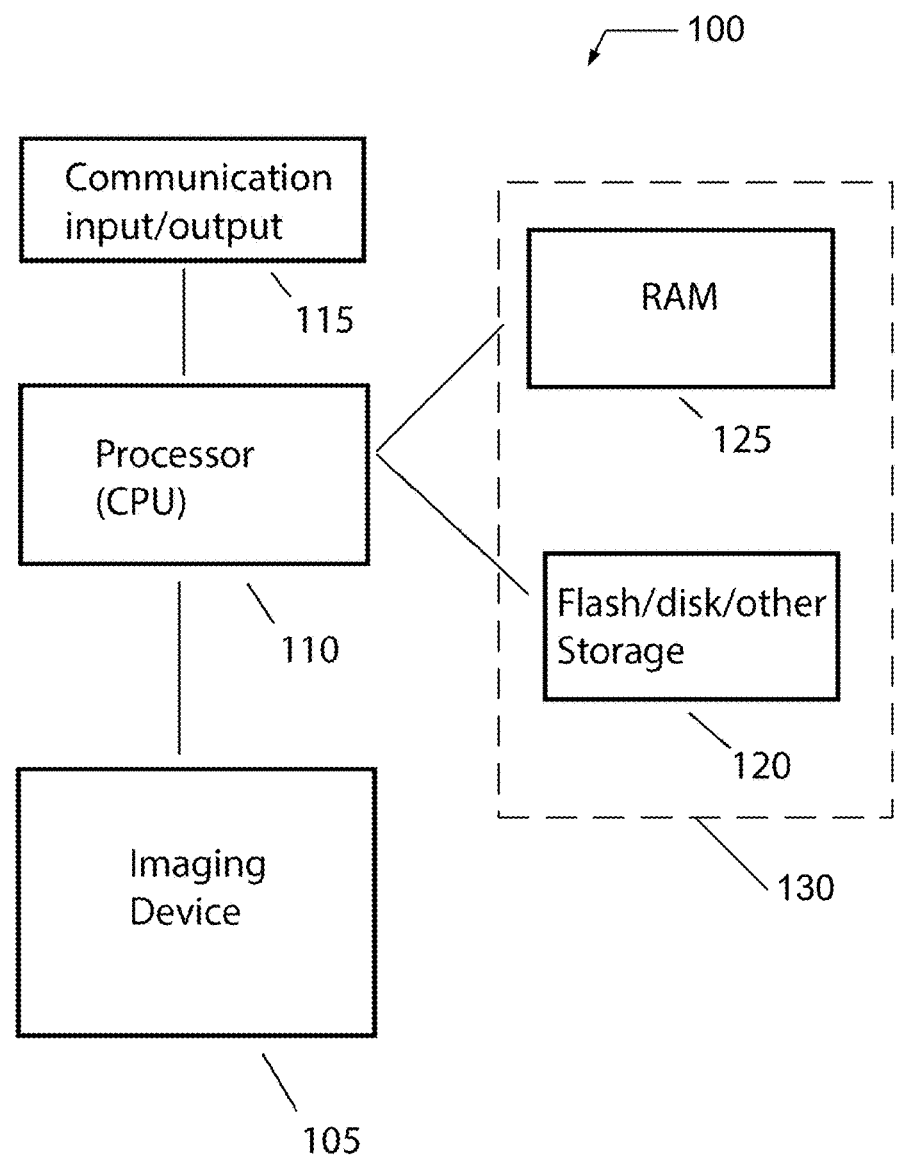
FIG. 1 illustrates a block schematic diagram of an embodiment for a pattern registration system.

Embodiments of the present invention provide a system, method, and computer program product for multiplicating pattern images used as a trusted resource while reducing user participation, such as, for example, a producing N number (N>1) of reconstructed pattern images using shared images common to at least two constructed pattern images. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "match," "matching," and "matches" refer to a conclusion of a comparison of a first pattern (e.g., a first image of a first impression from a sensor) against a second pattern (e.g., a second image of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions.

As used herein, the terms "correlate," "correlating," and "correlated" refer to a conclusion of a comparison of a first pattern (e.g., a first image of a first impression from a sensor) against a second pattern (e.g., a second image of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "multiplicate," "multiplicating," and "multiplicated" refer to a production of one or more additional structures, representations, patterns, reconstructions, reconstruction images, or the like that are, at a superficial or macro level, a duplication of a particular original structure, representation, pattern, reconstructions, reconstruction images, or the like but include, upon closer examination, differences that may be recognized and evaluated/considered by a process (such as a matching or alignment evaluation engine) that evaluates the original and additional structures, representations, patterns, reconstructions, reconstruction images against a structure under-test. At one level of consideration, they are duplicates of each other as they each are representative of the same pattern but at another level of consideration they are all different as they will include variations not shared among all the multiplicated structures.

Generally, the basic idea is that reconstruction of a pattern from a set of images of that pattern rely on partially unique data and partly duplicated data. A ratio of unique data to duplicated data typically varies for each image. In a particular implementation, the amount of duplicated data needs to be sufficient to enable the image to be accurately positioned and is desirably reduced as much as possible while retaining a desired level of confidence of the accurate positioning. The unique information is used to increase the pattern reconstruction. When reconstructing a pattern, an order in which the images are used determines which parts of an image are unique and which parts are duplicated. By multiplicating the pattern reconstruction using different unique contributions from the set of images, multiple distinct, but related, pattern reconstructions can be generated. It may be the case that a matching engine would not match each pattern construction with all the others, but each pattern reconstruction is expected to match at least one other multiplicated pattern reconstruction. In this way, any test image derived from the same pattern has an increased chance of matching at least one of the multiplicated pattern reconstructions. A chance of success improves as the number of multiplicated pattern reconstructions increases.

In other embodiments, a quality of the set of multiplicated pattern reconstructions may be improved by receiving a limited number of new impressions, and new images, for each multiplicated pattern reconstruction. Depending upon what portion of the pattern is provided by the new image(s), unique data from the previously used images is prioritized in creating a new pattern reconstruction. Each new image reconstruction thus greatly increases a quality of the set of multiplicated pattern reconstructions, such as for registration, to improve subsequent uses.

The herein described methods can be implemented in the general context of instructions executed by a stored program computer system coupled to a memory storing those instructions. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the herein described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 illustrates a block schematic diagram of an embodiment for a pattern registration system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint registration system that may be used as a pattern (e.g., fingerprint) verification system. In a fingerprint verification system, the system attempts to measure a correspondence between a pair of fingerprints (one-on-one) in order to establish, within some level of confidence, whether one pattern source of one fingerprint is the same or sufficiently close as a pattern source of the other fingerprint. This is contrasted with an identification system that determines which pattern source generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of curves derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint; either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Device 105, I/P communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 processes a set of pattern images from a pattern source (e.g., a fingerprint) to reconstruct a plurality of images of the pattern source. In some embodiments, each reconstructed image includes a few new images collected specifically for a particular reconstruction, with unused unique portions of previously used (in a different pattern reconstruction for example) images given priority over used portions of previously used images. Duplicated information in stored images may also be used on a lower priority as needed to develop any multiplicated reconstruction to a desired quality metric.

Figure 2:
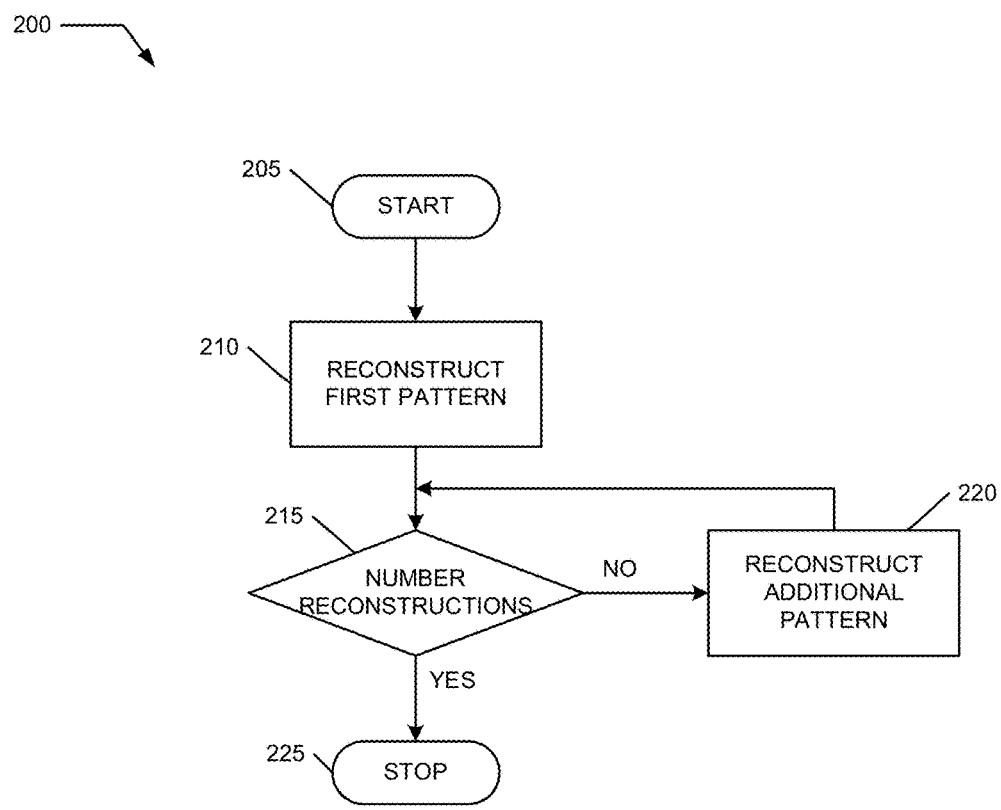
FIG. 2 illustrates a multiplicating pattern reconstruction process.

FIG. 2 illustrates a multiplicating pattern reconstruction process 200 including steps 205-225. Process 200 begins with step 205 and starts the method, including any variable initialization and resource reservation. After step 205, process 200 includes a reconstruction of a first pattern reconstruction. There are many ways that this may be accomplished. For example, U.S. Patent Application No. 62/185,004 and U.S. patent application Ser. No. 15/192,099, both titled Pattern Mapping and U.S. Patent Application No. 62/189,488 and U.S. patent application Ser. No. 15/201,901 both titled Image Reconstruction both include examples of pattern reconstruction processes that may be included in an acceptable reconstruction process, among other possible reconstruction methods, included with step 210 (the contents of these applications are hereby expressly incorporated by reference thereto in their entireties for all purposes).

In reconstruction step 210, multiple impressions are sampled from a pattern, each impression producing an image of the pattern. As referenced in the incorporated patent applications, some implementations of pattern mapping or pattern reconstruction may desirably remove images used in a mapped or reconstructed pattern. In contrast, the illustrated embodiments provide for storage of images of a source pattern. Some implementations may prefer that an image is removed from consideration in new image constructions when a particular amount of an image has been used, when an image has been used a particular number of times, or other metric. Reconstruction step 210 may, in some embodiments, flag duplicate images or redundant data in a matching image for later use in process 200.

After step 210, process 200 tests a number of multiplicated pattern reconstructions at step 215 to determine whether a desired number of pattern reconstructions have been produced. This number may be prespecified or it may be dynamically established based upon some quality metric of the set of multiplicated pattern reconstructions. Once such quality metric may indicate how much duplicated information is used in the set of multiplicated pattern reconstructions. Some applications may desire to place an upper threshold on how much duplicated data is reused.

When the test at step 215 is FALSE and the desired number of pattern reconstructions have not been produced, process 200 performs step 220 to produce an addition pattern reconstruction. Step 220 may, in some instances, process the images used in an existing pattern reconstruction in a different order than all other previous orders. As illustrated in FIG. 3-6, altering a processing order of images produces a unique pattern reconstruction as compared to pattern reconstructions using a different processing order.

In other embodiments, step 220 may collect new images from the user. In such a case, step 220 is different from step 215 in that process 200 does not collect a sufficient number of new images to completely reconstruct a pattern. Rather, a new foundation image is collected and reconstruction then begins reconstructing the pattern based upon the new foundation image. Based upon the new foundation image, images stored from previous reconstruction steps are used to reconstruct the image. After each addition to the pattern reconstruction, a priority may be given to test for a match against the currently stored images. When a match is established, the pattern reconstruction may blend the matching image in the pattern reconstruction. Then the new pattern reconstruction is again tested against the stored images. The processing continuing until the reconstructed image has sufficient quality or a new image needs to be collected from the user. During processing, in the event that multiple images match the pattern reconstruction, step 220 may give a priority to previously unused images over previously used images. In the event that multiple previously used images match the pattern reconstruction, then step 220 may give a priority to that previously used image having a greater portion of previously unused area. Other conditions may be used to establish a new processing order, select which stored image to use in the new processing order, and determining when and if process 200 asks the user for a new impression to collect a new image.

After step 220, process 200 returns to the test at step 215 and determines whether the set of multiplicated pattern reconstructions is complete. Process 200 continues to cycle through step 220 and step 215 until the test at step 215 is TRUE and the set of multiplicated pattern reconstructions is complete. When complete, process 200 advances to step 225 and terminates the multiplication of pattern reconstructions using process 200. Some output or post-reconstruction processing may occur at step 225.

Figure 3:
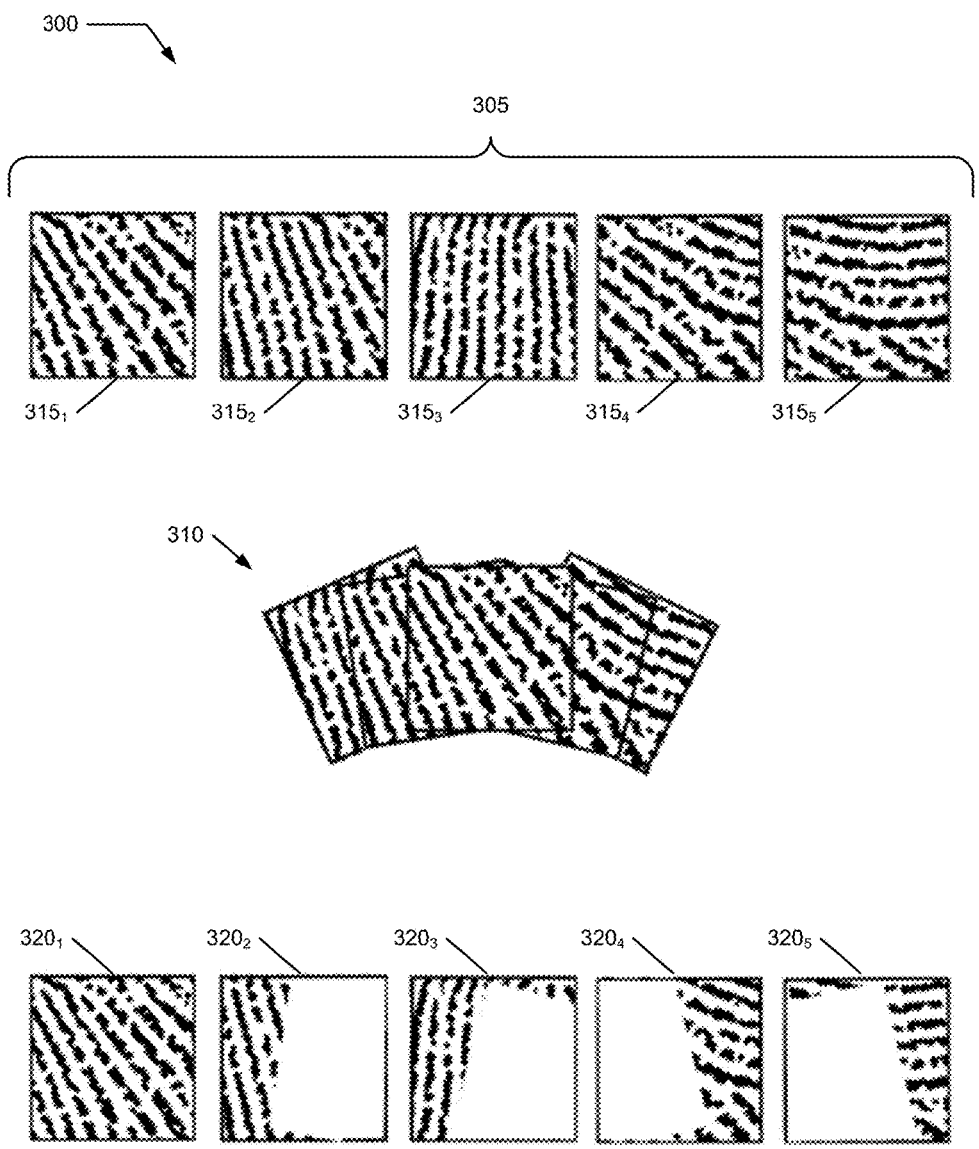
FIG. 3 illustrates a first pattern reconstruction state.

FIG. 3-FIG. 6 illustrate multiplicated pattern reconstructions from a single set of images, without addition of new images. FIG. 3 illustrates a first pattern reconstruction state 300 from a set 305 of images used to create a first pattern reconstruction 310. Set 305 includes N number (in this example N=5) of images 315. State 300 also includes an understanding of which portions of a used image 320 have been used and which portions have not been used. In images $320_i$, corresponding to images $315_i$ used in pattern reconstruction 310, the masked (void) areas in used image $320_i$ indicate duplicated information from a particular image $315_i$. To simplify the discussion, pattern reconstruction 310 has used all N number of images 315. An order of processing images $315_i$ to produce pattern reconstruction 310 could be, i=1, 2, 3, 4, 5. It is seen that $315_{i,i=1}$ is the foundation image as 100% of used image $320_1$ is used in pattern reconstruction 310. Thereafter, different areas of each image $315_{i,i=2-5}$ are processed (e.g., translated and rotated) to align the pattern information of each particular image 315 with pattern reconstruction 310. Process 200 may mark each used image 320 to indicate how much pattern information of the particular image was duplicated and how much was unique.

Figure 4:
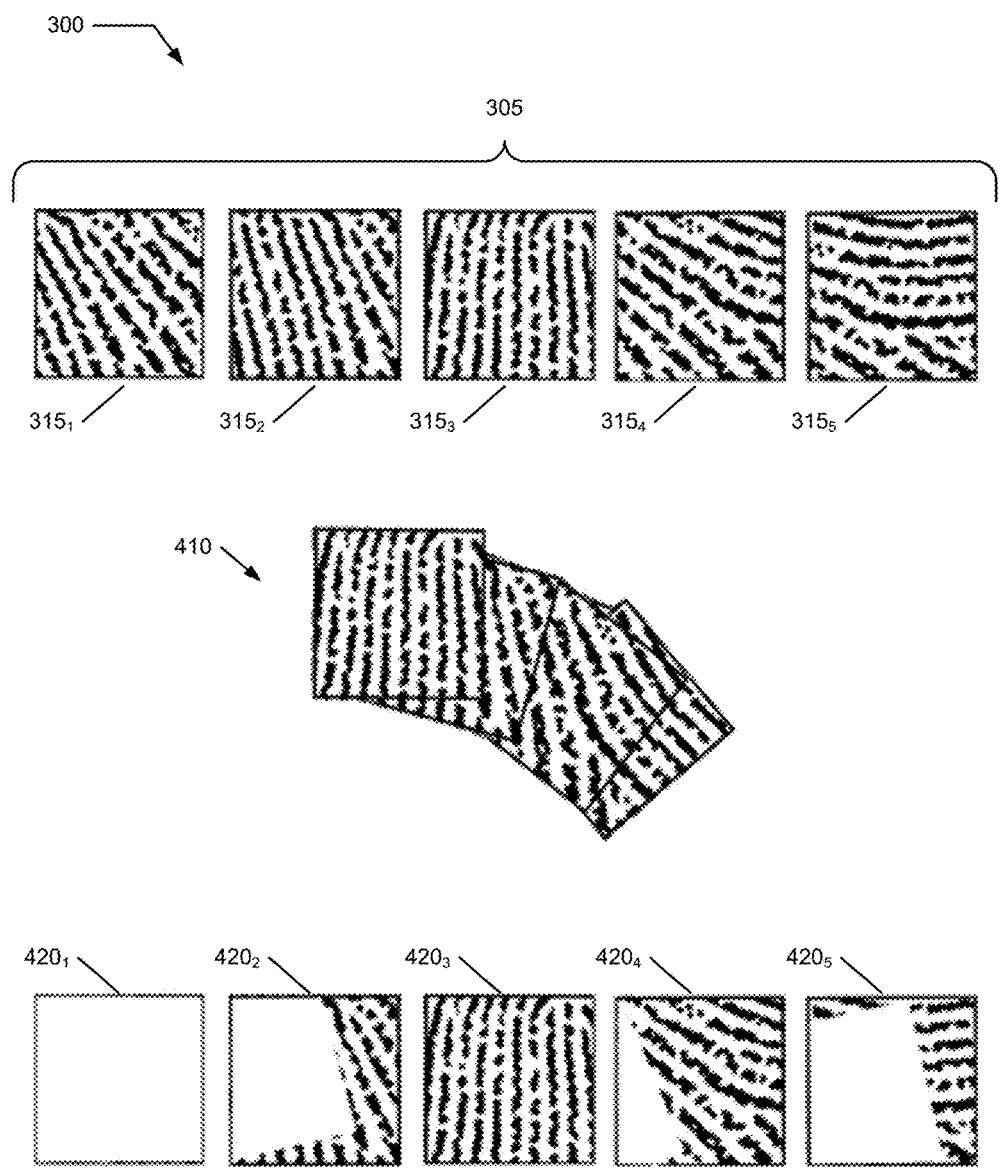
FIG. 4 illustrates a second pattern reconstruction state.

FIG. 4 illustrates a second reconstruction state 400 from set 305 of images used to create a second pattern reconstruction 410, different from, but matchable to (within some degree of confidence) first pattern reconstruction 310 of FIG. 3. State 400 also includes an understanding of which portions of a used image 420 have been used and which portions have not been used in second pattern reconstruction 410. In images $420_i$, corresponding to images $315_i$ used in pattern reconstruction 410, the masked (void) areas in used image $420_i$ indicate duplicated information from a particular image $315_i$. An order of processing images $315_i$ to produce second pattern reconstruction 410 could be, i=3, 2, 1, 4, 5. It is seen that $315_{i,i=3}$ is the foundation image as 100% of used image $420_3$ is used in second pattern reconstruction 410. Thereafter, different areas of each image $315_i$, are processed (e.g., translated and rotated) to align the pattern information of each particular image 315 with second pattern reconstruction 410 as it is being reconstructed. Process 200 may mark each used image 420 to indicate how much pattern information of the particular image was duplicated and how much was unique.

A comparison of used images $420_i$ with counterpart used images $320_i$ demonstrates that second pattern reconstruction 410, while being a reconstruction of the same pattern, has included different pattern information as compared to first pattern reconstruction 310.

Figure 5:
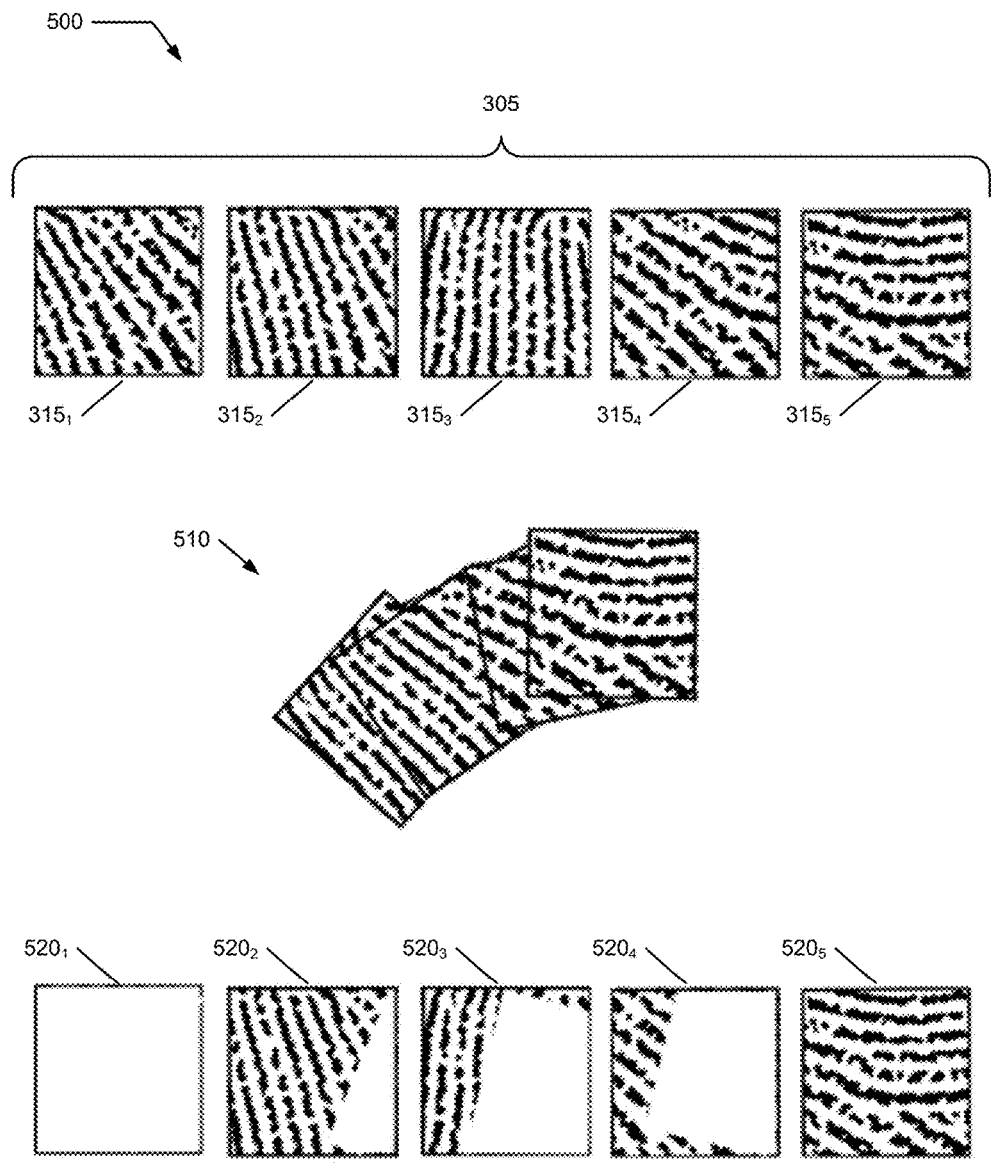
FIG. 5 illustrates a third pattern reconstruction state.

FIG. 5 illustrates a third reconstruction state 500 from set 305 of images used to create a third pattern reconstruction 510, different from, but matchable to (within some degree of confidence) first pattern reconstruction 310 of FIG. 3 and second pattern reconstruction 410 of FIG. 4. State 500 also includes an understanding of which portions of a used image 420 have been used and which portions have not been used in third pattern reconstruction 510. In used images $520_i$, corresponding to images $315_i$ used in third pattern reconstruction 510, the masked (void) areas in used image $520_i$ indicate duplicated information from a particular image $315_i$. An order of processing images $315_i$ to produce third pattern reconstruction 510 could be, i=5, 4, 3, 2, 1. It is seen that $315_{i,i=5}$ is the foundation image as 100% of used image $520_5$ is used in third pattern reconstruction 510. Thereafter, different areas of each image $315_i$, are processed (e.g., translated and rotated) to align the pattern information of each particular image 315 with third pattern reconstruction 510 as it is being reconstructed. Process 200 may mark each used image 520 to indicate how much pattern information of the particular image was duplicated and how much was unique.

A comparison of used images $520_i$ with counterpart used images $320_i$ and used images $410_i$ demonstrates that third pattern reconstruction 510, while being a reconstruction of the same pattern, has included different pattern information as compared to both first pattern reconstruction 310 and second pattern reconstruction 410.

Figure 6:
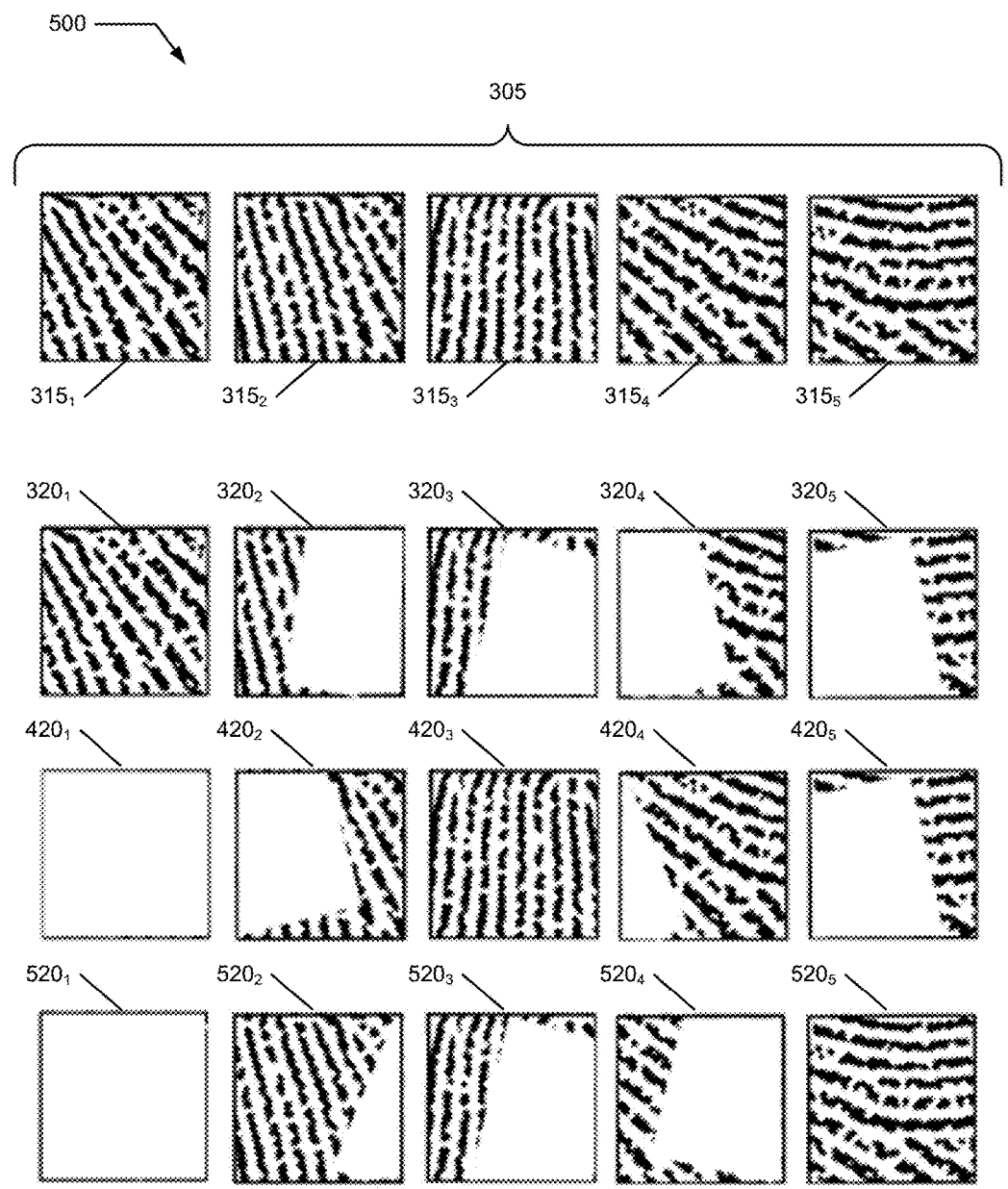
FIG. 6 illustrates a comparison of unique pattern information from each image from each of the states of FIG. 3-FIG. 5.

FIG. 6 illustrates a comparison 600 of corresponding used images $320_i$, $420_i$, and $520_i$ from images $315_i$ of set 305. As described herein, each set of used images indicate which pattern information was used in a corresponding pattern reconstruction. Comparison 600 illustrates how each pattern reconstruction will be of the same pattern, but include different pattern information from any other pattern reconstruction. Ideally, without noise, the pattern reconstructions in FIG. 3-FIG. 5 would be exact matches. However, noise contributions are random and will cause differences, many of which are small. On the scale of match testing, some small errors, especially in an event when they accumulate, may result in very similar, but significantly different computationally, pattern reconstructions. This is especially true in the case that the pattern reconstruction methods introduce noise. This can be the case with certain rotation and image manipulations. This is one reason why a different order results in different images being rotated differently. The ordering thus introduces different noise contributions to the used images than is the case with the same image used in a different pattern reconstruction of the same pattern.

Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention can be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 includes a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented method for multiplicating a reconstruction of a portion of a representation of a pattern from a set of images, each image including a portion of the pattern, and executing, by at least one processor, instructions recorded on a non-transitory computer-readable medium, the method comprising:

a) identifying, using the at least one processor, a reconstruction set of images from the set of images that all match or correlate to at least one other image in said reconstruction set, said reconstruction set of images excluding images that do not match or do not correlate to at least one other image in said reconstruction set;

b) producing, using the at least one processor, an initial reconstruction from an initial reconstruction subset of said reconstruction set from a first combination of said images of said initial reconstruction subset for a set of reconstructions; and c) producing, using the at least one processor, at least one multiplicated reconstruction from said initial reconstruction subset from an additional combination of said images of said initial reconstruction subset, each said additional combination different from all other said combinations defining one or more additional reconstructions included in said set of reconstructions.

2. The method of claim 1 wherein each image of said initial reconstruction subset contributes a unique pattern portion to its associated reconstruction and wherein each said combination includes a unique arrangement of differing unique pattern portions from said initial reconstruction set.

3. The method of claim 1 wherein said step a) comprises:
a1) selecting one of the images as a first foundation image having a first foundation pattern portion of a first foundation pattern source;
a2) processing the set of images to determine a reconstruction set of images, the portion of the pattern of each said image of said reconstruction set matched or correlated to said first foundation pattern portion, wherein said reconstruction set of images excludes each image from the set of images with its portion of the pattern not matched or not correlated to said first foundation pattern portion; and step b) comprises:
b1) combining said images of said reconstruction set into said initial reconstruction, said initial reconstruction including the portion of the representation spanning a reconstruction metric greater than an image metric of any single image of said reconstruction set, wherein said initial reconstruction subset includes images from said reconstruction set contributing to said initial reconstruction, and wherein said first combination includes a first particular order of combining said images of said initial reconstruction subset to produce said initial reconstruction.

4. The method of claim 3 wherein said step c) comprises:
c1) selecting another one of the images different from the image used for said first foundation image as a second foundation image having a second foundation pattern portion of said first foundation pattern source; and
c2) combining said images of said reconstruction set into one of said one or more additional reconstructions, each particular said additional reconstruction including the portion of the representation spanning a reconstruction metric greater than an image metric of any single image of said reconstruction set, wherein said initial reconstruction subset includes images from said reconstruction set contributing to said particular additional reconstruction, and wherein each said additional combination includes an additional particular order of combining said images of said initial reconstruction subset to produce said differing multiplicated additional reconstructions.

5. The method of claim 2 wherein said step a) comprises:
a1) selecting one of the images as a first foundation image having a first foundation pattern portion of a first foundation pattern source;
a2) processing the set of images to determine a reconstruction set of images, the portion of the pattern of each said image of said reconstruction set matched or correlated to said first foundation pattern portion, wherein said reconstruction set of images excludes each image from the set of images with its portion of the pattern not matched or not correlated to said first foundation pattern portion; and step b) comprises
b1) combining said images of said reconstruction set into said initial reconstruction, said initial reconstruction including the portion of the representation spanning a reconstruction metric greater than an image metric of any single image of said reconstruction set, wherein said initial reconstruction subset includes images from said reconstruction set contributing to said initial reconstruction, and wherein said first combination includes a first particular order of combining said images of said initial reconstruction subset to produce said initial reconstruction.

6. The method of claim 5 wherein said step c) comprises:
c1) selecting another one of the images different from the image used for said first foundation image as a second foundation image having a second foundation pattern portion of said first foundation pattern source; and
c2) combining said images of said reconstruction set into one of said one or more additional reconstructions, each particular said additional reconstruction including the portion of the representation spanning a reconstruction metric greater than an image metric of any single image of said reconstruction set, wherein said initial reconstruction subset includes images from said reconstruction set contributing to said particular additional reconstruction, and wherein each said additional combination includes an additional particular order of combining said images of said initial reconstruction subset to produce said differing multiplicated additional reconstructions;
wherein each said additional particular order selects any particular one image from said initial reconstruction subset responsive to an inverse weighting of a ratio of said unique pattern portion to a total pattern portion used in any previous said combination.

7. The method of claim 1 wherein each said additional reconstruction includes at least one image not shared by all other said reconstructions included in said set of reconstructions.

8. The method of claim 1 wherein each said additional reconstruction includes at least one image not shared by any other said reconstruction included in said set of reconstructions.

9. The method of claim 4 wherein each said additional reconstruction includes a unique image not shared by any other said reconstruction included in said set of reconstructions, said unique image included as said second foundation image.

10. The method of claim 1 further comprising:
d) registering said reconstructions included in said set of reconstructions into a trusted memory with all said reconstructions included in said set of reconstructions accepted as trusted representations of the pattern.

11. An apparatus for multiplicating a reconstruction of a portion of a representation of a pattern from a set of images, each image including a portion of the pattern, comprising:
an imaging device producing one or more of the images; and
a processing system, coupled to said imaging device, including a processor and a memory coupled to said processor, said memory storing a plurality of computer executable instructions wherein said processor executes said plurality of computer executable instructions to perform a method, comprising:
a) identifying, using said processor, a reconstruction set of images from the set of images that all match or correlate to at least one other image in said reconstruction set, said reconstruction set of images excluding images that do not match or do not correlate to at least one other image in said reconstruction set;
b) producing, using said processor, an initial reconstruction from an initial reconstruction subset of said reconstruction set from a first combination of said images of said initial reconstruction subset; and
c) producing, using said processor, at least one multiplicated reconstruction from said initial reconstruction subset from an additional combination of said images of said initial reconstruction subset, each said additional combination different from all other said combinations.

12. A non-transitory computer readable medium with computer executable instructions stored thereon executed by a processor to perform the method of multiplicating a reconstruction of a portion of a representation of a pattern from a set of images, each image including a portion of the pattern, and executing, by at least one processor, instructions recorded on a non-transitory computer-readable medium, the method comprising:
a) identifying, using the at least one processor, a reconstruction set of images from the set of images that all match or correlate to at least one other image in said reconstruction set, said reconstruction set of images excluding images that do not match or do not correlate to at least one other image in said reconstruction set;
b) producing, using the at least one processor, an initial reconstruction from an initial reconstruction subset of said reconstruction set from a first combination of said images of said initial reconstruction subset; and
c) producing, using the at least one processor, at least one multiplicated reconstruction from said initial reconstruction subset from an additional combination of said images of said initial reconstruction subset, each said additional combination different from all other said combinations.

* * * * *